United States Patent [19]

McCrossin

[11] 4,353,993

[45] Oct. 12, 1982

[54] FOAM COMPOSITIONS FOR SURFACE APPLICATION TO FIBROUS SUBSTRATES

[75] Inventor: Edward G. McCrossin, Portage, Mich.

[73] Assignee: Hercules Incorporated, Wilmington, Del.

[21] Appl. No.: 262,864

[22] Filed: May 12, 1981

[51] Int. Cl.³ .............................................. C08L 93/04
[52] U.S. Cl. ........................................ 521/65; 521/84
[58] Field of Search .................................. 521/65, 84

[56] References Cited

U.S. PATENT DOCUMENTS

| 2,370,058 | 2/1945 | Maguire | 252/356 |
| 2,593,008 | 4/1952 | Chappell, Jr. | 106/88 |
| 3,210,240 | 10/1965 | Read et al. | 162/175 |
| 4,099,913 | 7/1978 | Walter et al. | 8/173 |
| 4,184,914 | 1/1980 | Jenkins | 162/135 |

FOREIGN PATENT DOCUMENTS

| 2848194 | 5/1979 | Fed. Rep. of Germany . |
| 1039540 | 8/1966 | United Kingdom . |

Primary Examiner—Maurice J. Welsh
Attorney, Agent, or Firm—H. L. Deming

[57] ABSTRACT

Improved rosin-based foams suitable for surface application to fibrous substrates such as paper and paperboard are described. The foams are obtained by aerating an aqueous solution having a pH of at least 8 and containing 0.1 to 5% of a water-soluble salt of rosin or fortified rosin and 0.02 to 5% of a water-soluble, amine-containing polymer compatible with the salt, the weight ratio of the salt to the polymer being within the range of 1:1 to 25:1.

10 Claims, 1 Drawing Figure

FOAM COMPOSITIONS FOR SURFACE APPLICATION TO FIBROUS SUBSTRATES

This invention relates to foam compositions suitable for application to the surfaces of fibrous substrates such as paper and paperboard and more particularly to rosin-based foam compositions which have improved foamability and stability characteristics and are produced by the aeration of aqueous solutions containing a salt of rosin or fortified rosin and certain amine-containing polymers.

It is known that foams useful for application to fibrous substrates can be produced by the aeration of aqueous compositions containing a synthetic surface active agent such as, for example, sodium lauryl sulfate or a proteinaceous material which is capable of reducing the surface tension of water from a normal value of 72 dynes per centimeter to a minimum value in the range of 45 to 65 dynes per centimeter. See for example, British Pat. No. 1,039,540 and U.S. Pat. Nos. 3,210,240; 4,099,913; and 4,184,914. Synthetic surface active agent-based foams usually break immediately upon contact with the substrate and provide ready absorption of the aqueous composition into the substrate. Foams of this type, however, are of limited use for applying coating materials to the surface of paper and are not suitable for use on sized paper due to the wetting or detergent action of the surface active agent on the paper size. Protein-based foams, on the other hand, are heat sensitive and require careful control of processing and application conditions. Further, protein-based foams are not satisfactory for applying certain performance chemicals such as the high viscosity starches and cellulose derivatives to paper on the papermaking machine due to the poor flow characteristics and the high stability of the foams.

It is also known from U.S. Pat. No. 2,370,058 to Maguire that the foamability of aqueous solutions containing neutral rosin size can be improved by combining with the rosin size an alkali proteinate such as potassium caseinate. Foams produced from mixtures of rosin size and alkali proteinate at a ratio of 30:70 to 70:30 are said to be stable in the presence of large amounts of gypsum and to be particularly useful for the production of low density gypsum board. Maguire's foams containing both a rosin size and potassium caseinate are likewise heat sensitive and cannot be used at temperatures above 55° C. Further, the foams do not break readily on the paper machine and hence are not suitable for applying uniform and continuous surface coatings on moving paper substrates.

Further, Chappell, Jr. in U.S. Pat. No. 2,593,008 teaches that the foamability and the stability characteristics of aerated aqueous suspensions of calcined gypsum containing a small quantity of a soap of a partially gasoline-insoluble pine wood resin can be improved by using a blend of the soap with certain alcohols. Foams produced by aerating aqueous solutions containing a 1:1 blend of a salt of rosin and isopropanol without gypsum however, broke immediately and were not suitable for paper applications.

Additionally, German publication OLS No. 2,848,194 discloses that foams can be produced by the aeration of aqueous solutions, dispersions or emulsions containing a salt of rosin or fortified rosin and that the foams can be used to size paper or to apply other sizing agents or chemical additives to the surface of paper. Foams produced from solutions containing salts of rosin or fortified rosin as the sole foam stabilizing ingredient, however, are generally coarse and frothy in nature, and do not possess sufficient stability for commercial acceptance on conventional paper machines. Hence, rosin-based foams offer little advantage over the use of aqueous solutions or dispersions of rosin soaps for the same purpose and are not commercially attractive.

Now, in accordance with this invention, it is has been found that the foamability and the stability of foams obtained by the aeration of aqueous solutions containing salts of rosin or fortified rosin can be improved without detriment to the other desired properties of the foam and that the resulting foams can be applied conventionally to the surface of any fibrous substrate including sized paper or paperboard.

Accordingly, this invention relates to an improved rosin-based foam for surface application to a fibrous substrate, and more particularly relates to the foam produced by aerating an aqueous solution having a pH of at least 8 and containing from 0.1 to 5 weight % of a water-soluble salt of rosin or fortified rosin and from 0.02 to 5 weight % of at least one water-soluble, amine-containing synthetic addition- or condensation-type polymeric material compatible with said salt, the weight ratio of said salt to said polymeric material being within the range of 1:1 to 25:1. The invention also relates to a process for producing the improved foams and particularly relates to an improved process wherein the aeration step is carried out on the aqueous solution described above.

The FIGURE of the accompanying drawing is a graph which shows the relationship of solution concentration (within the limits of 0.2 and 1.0%) to the foamability of the solutions.

The essential components of the solutions which are aerated to provide the improved foams of this invention are a water-soluble salt of rosin or fortified rosin, certain water-soluble polymeric materials containing amine functionality and water.

Salts of rosin are well known to the art and include salts of wood rosin, gum rosin and tall oil rosin in crude or refined state and/or after treatment of various kinds to increase its effectiveness for the intended purpose. Thus, the term includes salts from modified rosins such as partially or substantially completely hydrogenated rosins and polymerized rosins as well as rosins which have been heat treated in the presence of an acid catalyst to isomerize the abietic-type acids, reacted with formaldehyde, or otherwise treated to inhibit crystallization of the rosin. Salts of fortified rosin, as used herein, refers to salts of any of the above rosins which have been reacted with an acidic compound containing the group such as the alpha-beta-unsaturated organic acids and their available anhydrides to provide adducts having an increased number of carboxylic acid groups, with or without additional modification, such as by heat treatment. Typical unsaturated acids and anhydrides include fumaric acid, maleic acid, acrylic acid, maleic anhydride, itaconic acid, itaconic anhydride, citraconic acid, citraconic anhydride, and mixtures of such acids or anhydrides. Methods of preparing fortified rosin are disclosed and described in U.S. Pat. Nos. 2,628,918 and 2,684,300.

The water-soluble salts of the above rosins and fortified rosins are preferably the alkali metal and particularly the sodium or potassium salts and are obtained by neutralization or saponification of the rosin acids (and other acids), with a controlled amount of an alkaline material such as sodium or potassium hydroxide. Generally, the extent of neutralization will be about 100% and usually excess alkali (as the hydroxide or carbonate) is used to maintain the pH on the alkaline side, and preferably within the range of about 8 to 12.

As stated, the solutions which are aerated also contain a water-soluble polymeric material which contains amine functionality and which is compatible with the salt of rosin or fortified rosin. The polymeric material is a synthetic addition- or condensation-type polymer containing amino nitrogen. By the term "amine-containing" or "amine functionality" as used herein is meant an active or reactive group containing basic nitrogen, i.e., primary, secondary, or tertiary amine groups, the salt form of such groups and quaternary ammonium salt groups. The presence of at least one such group in a unit of the polymer provides basicity or cationic properties to the polymer. Depending upon the nature of the other units of the polymer, usually at least about 10% of the units of the polymer will contain amino nitrogen. Addition- and condensation-type polymers of this type are known to the art and include the polyaminopolyamides, the poly(alkylenimine)s, and addition polymers of ethylenically unsaturated monomers containing amine functionality. Derivatives of these polymers and particularly the reaction products of a polyaminopolyamide with 0.02 to 0.2 mole of epihalohydrin for each secondary and/or tertiary amine group of the polyaminopolyamide are also useful, provided of course that the derivative meets the other criteria, i.e., is water soluble, and is compatible with the salt of rosin or fortified rosin.

The preferred water-soluble polyaminopolyamides are condensation type polymers derived from a polyalkylenepolyamine and a dicarboxylic acid and contain recurring units of the formula where n is an integer 2 through 6, x is an integer 1 through 4, R is hydrogen or $C_1$–$C_4$ alkyl and $R^1$ is the divalent hydrocarbon radical of the dicarboxylic acid.

Particularly suitable dicarboxylic acids are diglycolic acid and saturated aliphatic dicarboxylic acids containing from 4 through 10 carbon atoms such as succinic acid, glutaric acid, adipic acid, pimelic acid, suberic acid, azelaic acid, and sebacic acid. Other suitable dicarboxylic acids include terephthalic acid, isophthalic acid, phthalic acid, maleic acid, fumaric acid, itaconic acid, glutaconic acid, citraconic acid, and mesaconic acid. The available anhydrides of the above acids can be used in preparing the water-soluble polyaminopolyamides as well as the esters of the acids. Mixtures of two or more dicarboxylic acids, their anhydrides, and their esters can be used to prepare the water-soluble polyaminopolyamides, if desired.

The polyalkylenepolyamine employed in preparing the polyaminopolyamide is represented by the formula where R is hydrogen or $C_1$–$C_4$ alkyl; n is an integer 2 through 6 and x is an integer 1 through 4. Examples of $C_1$–$C_4$ alkyl are methyl, ethyl, propyl, isopropyl, n-butyl, isobutyl and t-butyl. Specific examples of polyalkylenepolyamines of the above formula include diethylenetriamine; triethylenetetramine; tetraethylenepentamine; dipropylenetriamine; dihexamethylenetriamine; pentaethylenehexamine; methylbis(3-aninopropyl)amine; methyl bis(2-aminoethyl)amine; and 4,7-dimethyltriethylenetetramine. Mixtures of polyalkylene polyamines can be used, if desired.

The water-soluble reaction products of the polyaminopolyamides derived by the reaction of the polyaminopolyamide with 0.02 to 0.2 mole of an epihalohydrin, such as epichlorohydrin or epibromohydrin, for each secondary and/or tertiary amine group of the polyaminopolyamide are particularly useful. The reaction is generally carried out at a temperature of from about 25° to 100° C., and preferably from 45° to 70° C. until the Brookfield viscosity of a 20% solids solution in water at 25° C. has reached about 10 cps or higher. This reaction is preferably carried out in water to moderate the reaction. Usually the reaction is carried out at a pH of about 8 to 9 for 1 to 5 hours after addition of the epihalohydrin and then the pH is lowered to about 4 to 5 with mineral acid to stabilize the polymer solution.

Typical of suitable poly(alkylenimine)s are the water-soluble, relatively low molecular weight poly(ethylenimine)s having a molecular weight of at least about 500 and an upper molecular weight limited only by the solubility of the resin in water. The polymerization of alkylenimines has been reviewed by Jones, "The Polymerization of Olefin Imines", in P. H. Plesch, ed., The Chemistry of Cationic Polymerization, New York, Macmillan (1963), pages 521–534. Suitable polymers for the purpose of this invention are disclosed by Jones and include the polymers of ethylenimine, 2-methylethylenimine, 2-ethylethylenimine, cis-2,3-dimethylethylenimine, trans-2,3-dimethylethylenimine, and 2,2-di-methylethylenimine. Particularly useful are the commercial poly(ethylenimine)s, such as those available from Dow Chemical Company under the trade designations PEI 6, PEI 12 and PEI 18.

Also useful are the water-soluble addition polymers of ethylenically unsaturated monomers containing amine functionality. Particularly useful polymers of this type are the addition type polymers prepared from ethylenically unsaturated monomers having the formulas (I), (II), (III), (IV), (V), and (VI), below.

wherein $R_1$ is hydrogen or methyl; $R_2$ is a $C_1$–$C_4$ alkyl such as methyl, ethyl, propyl or butyl; $R_3$ is hydrogen, a $C_1$–$C_4$ alkyl,

(where Y is hydroxyl or halogen such as chlorine or bromine) or and $X^-$ is an anion such as $Cl^-$, $Br^-$, $CH_3OSO_3^-$ or $CH_3COO^-$. Monomers of formula (I) are quaternary ammonium salts and acid salts of aminoacrylates such as dimethylaminoethylacrylate, diethylaminoethylacrylate, dimethylaminoethylmethacrylate and diethylaminoethylmethacrylate. Specific quaternary salt monomers having the formula (I) are methacryloyloxyethyltrimethylammonium methyl sulfate and methacryloyloxyethyltrimethylammonium chloride. Specific acid salt monomers having the formula (I) are methacryloyloxyethyldimethylammonium chloride and methacryloyloxyethyldimethylammonium acetate.

where each $R_3$ is alike or different and $R_3$ and $X^-$ are as defined in formula (I). The formula (II) monomers are quaternary ammonium salts and acid salts of a diallylamine having the formula where $R_3$ is as defined above. Specific examples of quaternary ammonium salt monomers having formula (II) are N,N-dimethyldiallylammonium chloride and N,N-dimethyldiallylammonium bromide. Specific examples of acid salt monomers having formula (II) are N-methyldiallylammonium acetate, diallylammonium chloride, N-methyldiallylammonium bromide, N-ethyldiallylammonium bromide, N-isopropyldiallylammonium chloride, N-n-butyldiallylammonium bromide, and N-tertbutyldiallyammonium chloride.

where $R_2$, $R_3$ and $X^-$ are as defined in formula (I). Specific examples of monomers of formula (III) are vinylbenzyltrimethylammonium chloride and vinylbenzyltrimethyl ammonium bromide.

where $R_3$ and $X^-$ are as defined in formula (I). Specific examples of monomers of formula (IV) are 2-vinylpyridinium chloride and 2-vinylpyridinium bromide.

In formula (V), $R_1$, $R_2$, $R_3$ and $X^-$ are as defined in formula (I), and n is an integer 1, 2 or 3. A specific example of a monomer of formula (V) is methacrylamidopropyldimethylammonium chloride.

In formula (VI), $R_1$, $R_2$, $R_3$ and $X^-$ are as defined in formula (I). A specific example of a monomer of formula (VI) is 3-methacryloyloxy-2-hydroxypropyldimethylammonium chloride.

The preferred water-soluble addition polymers are homopolymers of the monomers shown in formulas (I) through (VI), copolymers of any two or more of the monomers shown in formulas (I) through (VI) and copolymers of at least one of the monomers shown in formulas (I) through (VI) and at least one other ethylenically unsaturated monomer, preferably a nonionic monomer. Thus the preferred polymers will consist essentially of from about 10 mole % to 100 mole % of at least one monomer shown in formulas (I) through (VI) and from about 90 mole % to 0 mole % of at least one other ethylenically unsaturated monomer such as the monoethylenically unsaturated amides and particularly acrylamide, methacrylamide, ethacrylamide and t-butylacrylamide; methyl and other alkyl acrylates and methacrylates; the 2-hydroxyethyl acrylates and methacrylates; acrylonitrile and methacrylonitrile; vinyl acetate; vinyl sulfonamide; N-vinyl pyrrolidone and the like.

The water-soluble addition polymers of the above monomers are easily and readily prepared by adding simultaneously, the desired monomers in the desired amounts and a water-soluble free-radical polymerization initiator, each in aqueous solution, to a reaction vessel containing water maintained at a temperature of about 80° to 90° C. Typical free-radical polymerization initiators are the heat activated initiators such as sodium persulfate and ammonium persulfate and the so-called redox initiator systems such as ammonium persulfate-sodium bisulfite-ferrous ion and t-butyl hydroperoxide-sodium formaldehyde sulfoxylate.

The compositions of this invention are foams produced by the aeration of an aqueous solution having a pH of at least 8 and containing from 0.1 to 5% of a water-soluble salt of rosin or fortified rosin and from 0.02 to 5% of certain water-soluble polymers, the weight ratio of salt to polymer being within the range of 1:1 to 25:1. Preferably the amount of the salt of rosin or fortified rosin will range from about 0.1 to about 3% and more preferably from about 0.2 to about 1% by weight of the solution, and the amount of polymeric material will range from about 0.02 to about 3% and more preferably from about 0.02 to about 1% by weight of the solution.

If desired, conventional performance materials such as paper chemicals and particularly starch and modified starch, sodium carboxymethyl cellulose, poly(vinyl alcohol), sodium alginate, salts of styrene/maleic anhydride copolymers, latices, dyes, wet- and/or dry-strength resins, pigments, pigmented coatings, wax, grease-proofing agents and the like can also be added to the solution and applied to the surface of a fibrous substrate using the foam composition described herein as the carrier therefor. Usually such chemicals are added to the solution before foam generation and it is understood that the amount used will vary depending upon the type and purpose intended but should not unduly affect the desired foam properties and the application of the foam to a paper web. Usually, the amount of performance material will range from about 0.1 to about 50% of the solution.

The foams of this invention are generated from the aqueous solutions using commercially available foam generating apparatus which generally is comprised of a mechanical agitator capable of mixing metered quantities of a gas, such as air into a solution. Commercially available generators include the Dyna-Foam generator (Dyna-Foam Company, Media, PA) and the Cellier generator (Cellier, Air-les-Bains, France).

Since the foams of this invention contain a salt of a rosin-based material, the foams are particularly useful as sizing agents for paper substrates which contain a rosin-precipitation or "fixing" agent such as alum, which is the almost universal precipitating agent for rosin. The amount of alum required to set the rosin component of the foam on the paper surface is well recognized in the art and in practice will exceed the theoretical amount of alum required to react with the rosin salt. Also, by the application of the foams described in this invention to the surface of a paper substrate which has been internally sized with rosin, it is possible to take advantage of the presence of any excess alum and thus to further improve the sizing properties of the paper.

The foams of this invention can be applied to the paper by any convenient means such, for example, as by use of an air knife, rolls, Meyer rod or reciprocating brush coater. The foam is subsequently disintegrated in the nip of a press or by a knife or edge extending across the moving paper web. Means for generating foams, means for applying foam to a paper substrate, and means for disintegrating the foam are known in the art and form no part of this invention.

The following examples A to F describe the rosin salts and the amine-containing polymers used in Examples 1 to 11 which illustrate the preparation of the foams described by this invention. All parts and percentages are by weight unless otherwise specified.

EXAMPLE A

A salt of rosin was prepared as follows. A 200-gram sample of tall oil rosin having an acid number of 159 was crushed and placed in a one-quart Waring blender and blended four times for 30 sec. each time. A solution of 19.5 grams sodium hydroxide in 82.2 grams distilled water was added slowly and the mixture was blended until smooth (20–25 minutes). The product, following cooling to room temperature, was adjusted to an acid number of 22 with sodium hydroxide solution, and the total solids of the product was adjusted to 70.6% with distilled water.

EXAMPLE B

A 16% maleic anhydride adduct of gum rosin was prepared as follows. A one-liter, three-necked flask equipped with a thermometer, a mechanical stirrer, an addition funnel and a 1-ml. syringe was charged with 500 grams crushed gum rosin (acid number 160.1) and the charge was heated with stirring to 150° C. Next, 0.27 ml. of concentrated sulfuric acid was added and heating was continued at 144°–150° C. for thirty minutes, following which time 0.27 ml. concentrated sulfuric acid was added. Next, 89.2 grams of maleic anhydride was added over a period of 37 minutes while maintaining the temperature at 146°–155° C. and then concentrated sulfuric acid was added in two separate 0.07-ml. portions and the temperature was controlled at about 148° C. The product was poured into an aluminum pan and allowed to cool. The product had an acid number of 310 and contained 0.8% free maleic anhydride.

A sodium salt of the 16% maleic anhydride adduct of gum rosin prepared above was formed by heating 500 grams of the adduct, 510 grams of water and 105 grams of sodium hydroxide at 90° C. for 45 minutes with stirring, adding an additional 3 grams of the rosin adduct, and then cooling the product to room temperature. The product was an aqueous solution containing 48.0% total solids, having a pH of 12.8 and a Brookfield viscosity at 25° C. of 350 cps.

EXAMPLE C

A polyaminopolyamide resin was formed as follows. A one-liter resin kettle fitted with a stirrer, a thermometer, a nitrogen sparge, a condenser, a Dean-Stark trap and a heating mantle was charged with 300.2 grams of diethylenetriamine (2.94 mole). Adipic acid (438.3 grams, 3.00 mole) was added cautiously over a period of 10 minutes. The mixture was stirred and heated at 159°–202° C., and the water formed during the reaction (107 ml.) was removed through the Dean-Stark trap. The product was poured into an aluminum pan and allowed to cool and solidify. The product consisted of 559.2 grams (89% yield) of a yellow-orange resin having a reduced specific viscosity (RSV) of 0.137, as measured on a 2% solution in 1 M $NH_4Cl$. The product was dissolved in hot water to give an aqueous solution containing 50.3% total solids.

EXAMPLE D

An epichlorohydrin derivative of the polyaminopolyamide prepared in Example C was formed by adding 240.75 grams (121.1 grams dry, 0.57 mole) of the polyaminopolyamide solution of Example C, 406.5 grams of deionized water and 2.73 grams (0.03 mole) of epichlorohydrin (equivalent to 0.05 mole of epichlorohydrin for each secondary amine group theoretically present in the polymer) to a vessel, stirring the mixture and maintaining the mixture at 49°–52° C. for three hours, during which time the pH dropped from 8.8 to 8.4. The product was cooled to room temperature and the pH was lowered to 4.5 by adding concentrated sulfuric acid. The yield was 671.6 grams (97% yield) of a solution containing 21.2% total solids. The resin had an RSV of 0.156 (measured on a 2% solution in 1 M $NH_4Cl$).

EXAMPLE E

A commercial poly(ethylenimine) having a number average molecular weight of 1800, a minimum assay of 99% and Brookfield viscosity of 4.1 cps. at 25° C. as a 5% aqueous solution was obtained from Dow Chemical Company bearing the trade designation PEI 18.

EXAMPLE F

A copolymer of dimethylaminoethylmethacrylate and acrylamide was prepared as follows. A one-liter jacketed resin kettle fitted with a stirrer, condenser, a thermometer, a pH meter, an addition funnel and a 50-ml. burette was charged with 86.0 grams distilled water. The addition funnel was charged with a solution containing 44.75 grams dimethylaminoethylmethacrylate (0.285 mole), 44.75 grams acrylamide (0.630 mole) and 250.5 grams distilled water, the pH having been adjusted to 4.0 using concentrated hydrochloric acid solution and the burette was charged with 2.2 grams ammonium persulfate dissolved in 24.5 grams distilled water. The water in the kettle was heated to 85° C. and the contents of the addition funnel and the burette were added dropwise over a period of two hours while maintaining the temperature at 82°–86° C. The resulting solution was cooled to room temperature and contained 22.6% of a copolymer having an RSV of 0.411 (measured on a 1% solution in 1 M $NH_4Cl$).

The following examples 1 to 11 illustrate the preparation of the foams described by this invention. All parts and percentages are by weight unless otherwise specified.

EXAMPLE 1

A foamable solution was prepared by blending 8.5 parts of the solution of Example A, sufficient 25% sodium hydroxide to raise the pH to about 10 and 4.73 parts of the solution of Example D and diluting the blend with water to provide a solution containing 0.6% of rosin salt and 0.1% of an epichlorohydrin derivative of a polyaminopolyamide, and having a total solids content of 0.7%. The pH of the solution was adjusted to 10 and the solution was foamed using a modified commercial foam generator manufactured by the Dyna-Foam Company, Media, PA. The generator was modified for use with lower flow rates by decreasing the diameter of the packed tube to ½ inch and increasing its length to two feet. The solution was pumped through the generator at a rate of 128 ml./min. and air under pressure was introduced to generate a foam having an expansion factor (volume of foam/weight of foam) of about 20. The resulting foam had an expansion factor of 19.7 and a half-life of 455 seconds. The half-life of the foam is a measure of the foam stability and was evaluated by determining the time period required for a given weight of foam of known density to provide a liquid volume equivalent to one-half of the original weight of the foam.

When a control foam was generated in the same manner as this example except that the aqueous solution contained 0.7% of the salt of rosin (Example A, 100% solids basis) and none of the solution of Example D, the foam had an expansion factor of 19.3 and a half-life of 305 seconds, indicating that the foam of this example had vastly improved stability over the control foam even though the amount of rosin salt used in the example was only about 85% of the amount used in the control. Further, the data demonstrate that the presence of the polyaminopolyamide derivative did not interfere with the foaming characteristics of the solution, since the conditions for preparing the foam did not require alteration.

EXAMPLE 2

Foamable solutions were prepared according to the procedure of Example 1 by blending various amounts of the solution of Example B and the solution of Example D, the blends were diluted to 0.7% solids content with water and the resulting solutions were adjusted to a pH of 10. Foams were then generated from these solutions and from a control solution containing 0.7% of the rosin salt of Example B (100% solids basis) using the procedure of Example 1. Details of the trials of this example and the evaluation of the foams are summarized below in Table I.

TABLE I

| | Aqueous Solution | | | Foam | |
|---|---|---|---|---|---|
| Trial | Rosin Salt $B^{(1)}$ (%) | Polymer $D^{(1)}$ (%) | Weight Ratio Salt: Polymer | Expansion Factor (ml/g) | Half-Life (Sec) |
| 2-1 | 0.673 | 0.027 | 25 | 19.7 | 286 |
| 2-2 | 0.667 | 0.033 | 20 | 20.5 | 340 |
| 2-3 | 0.656 | 0.044 | 15 | 20.3 | 237 |
| 2-4 | 0.636 | 0.064 | 10 | 20.9 | 475 |
| 2-5 | 0.583 | 0.117 | 5 | 19.4 | 736 |
| 2-6 | 0.467 | 0.223 | 2 | 19.7 | 849 |
| 2-7 | 0.350 | 0.350 | 1 | 18.9 | 591 |
| Control | 0.700 | — | — | 19.4 | 169 |

$^{(1)}$on a 100% solids basis

EXAMPLE 3

The procedure of Example 2 was repeated except that an equal amount on a 100% solids basis of the polymer of Example C was substituted for the polymer derivative of Example D. Details of the trials of this example and the evaluation of the foams are summarized below in Table II.

TABLE II

| | Aqueous Solution | Foam | |
|---|---|---|---|
| Trial | Weight Ratio Salt:Polymer | Expansion Factor (ml/g) | Half Life (Sec) |
| 3-1 | 25 | 20.3 | 273 |
| 3-2 | 20 | 20.7 | 320 |
| 3-3 | 15 | 20.3 | 267 |
| 3-4 | 10 | 20.2 | 209 |

TABLE II-continued

| | Aqueous Solution | Foam | |
|---|---|---|---|
| Trial | Weight Ratio Salt:Polymer | Expansion Factor (ml/g) | Half Life (Sec) |
| 3-5 | 5 | 20.7 | 213 |
| 3-6 | 2 | 19.8 | 246 |
| 3-7 | 1 | 20.5 | 109 |
| Control | — | 19.5 | 165 |

EXAMPLE 4

The procedure of Example 2 was repeated except that an equal amount on a 100% solids basis of the poly(ethylenimine) of Example E was substituted for the polymer derivative of Example D and the resulting solutions were adjusted to a pH of 10.5 (10.1 for the control). Details of the trials of this example and the evaluation of the foams are summarized in Table III below.

TABLE III

| | Aqueous Solution | Foam | |
|---|---|---|---|
| Trial | Weight Ratio Salt:Polymer | Expansion Factor (ml/g) | Half Life (Sec) |
| 4-1 | 25 | 20.7 | 258 |
| 4-2 | 20 | 18.8 | 595 |
| 4-3 | 15 | 19.4 | 618 |
| 4-4 | 10 | 19.7 | 514 |
| 4-5 | 5 | 20.0 | 493 |
| 4-6 | 2 | 19.5 | 630 |
| 4-7 | 1 | 19.4 | 616 |
| Control | — | 19.1 | 140 |

EXAMPLE 5

The procedure of Example 2 was repeated except that an equal amount of a 100% solids basis of the copolymer of Example F was substituted for the polymer derivative of Example D. Details of the trials of this example and the evaluation of the foams are summarized below in Table IV.

TABLE IV

| | Aqueous Solution | Foam | |
|---|---|---|---|
| Trial | Weight Ratio Salt:Polymer | Expansion Factor (ml/g) | Half Life (Sec) |
| 5-1 | 25 | 19.2 | 323 |
| 5-2 | 20 | 19.7 | 343 |
| 5-3 | 15 | 20.9 | 305 |
| 5-4 | 10 | 20.2 | 278 |
| 5-5 | 5 | 19.7 | 277 |
| 5-6 | 2 | 19.8 | 293 |
| 5-7 | 1 | 19.2 | 584 |
| Control 1 | — | 19.7 | 161 |
| Control 2 | — | 19.2 | 169 |

EXAMPLE 6

A foamable solution was prepared by mixing 12.5 parts of the solution of Example B and 4.73 parts of the solution of Example D, diluting the mixture with a solution containing 0.5% of cellulose gum (medium viscosity sodium carboxymethyl cellulose having D.S. of 0.9) to provide a total solids content of 1.2% and adjusting the solution to a pH of 10. A foam was then generated from the solution and from a control solution containing 0.7% of the rosin salt of Example B (100% solids basis) and 0.5% of the cellulose gum using the foam generator of Example 1. The foam of this example had an expansion factor of 11.4 and a half-life of 661 seconds whereas the control foam had an expansion factor of 12.6 and a half-life of 459 seconds.

EXAMPLE 7

The procedure of Example 6 was repeated except that a styrene/butadiene copolymer latex (Dow 620 SBR latex, 50% totals solids) was substituted for the 0.5% solution of the cellulose gum and a foam was generated from this dispersion (50.7% total solids). The foam of this example had an expansion factor of 6.8 and a half-life of 54 minutes whereas the control foam (dispersion contained 50% latex and 0.7% rosin salt) had an expansion factor of 6.9 and a half-life of 32 minutes.

EXAMPLE 8

Example 6 was repeated except that an aqueous solution containing 2.6% of oxidized starch (Stayco C) was substituted for the 0.5% solution of the cellulose gum and the mixture was diluted to a total solids content of 3.6%. A foam was then generated from the resulting solution and from a control solution containing 1.0% of the rosin salt and 2.6% of the starch using the procedure of Example 1. The foam of this example had an expansion factor of 18.9 and a half-life of 500 seconds whereas the control foam had an expansion factor of 17.7 and a half-life of 325 seconds.

EXAMPLE 9

A foamable solution was prepared by mixing 12.5 parts of the solution of Example B and 4.73 parts of the solution of Example D, diluting the mixture with a solution containing 6% of hydroxyethylated starch (Penford Gum 290) to provide a total solids content of 6.8% and adjusting the solution to a temperature of 50° C. and a pH of about 9.0. A foam was then generated from the solution and from a control solution having a temperature of 50° C. and a pH of about 9.0 and containing 0.8% of the rosin salt of Example B (100% solids basis) and 6% of the hydroxyethylated starch using the foam generator of Example 1 and sufficient air pressure to provide an expansion factor of about 17.

The foam of this example and the control foam were applied to the felt side of a paper sheet at the size press of a pilot scale papermaking machine. The paper sheet was made from 50% bleached hardwood: 50% bleached softwood pulp beaten to a Canadian standard freeness of 500. The foam was applied at 4 equidistant locations across the upper rubber roll of the size press, thereby forming a "pond" in front of the nip of the size press rolls on the surface of the paper. The foam subsequently broke completely on passage through the nip of the press rolls. The paper sheet was aged for 3 weeks and then conditioned at 50% relative humidity at 72° F. for 24 hours before testing to determine strength (dry tensile strength and Mullen Burst) and smoothness (Sheffield). The results are reported below in Table V.

TABLE V

| | Basis Weight (lb/3000 ft.²) | Machine Direction Dry Tensile (lb/inch width) | Mullen Burst(psi) | Sheffield Smoothness |
|---|---|---|---|---|
| Example 9 | 45.1 | 23.9 | 34.7 | 260 |
| Control | 48.4 | 26.4 | 37.2 | 290 |
| Blank | 48.3 | 19.3 | 23.0 | 310 |

EXAMPLE 10

A foamable solution was prepared by mixing 14.5 parts of the solution of Example B and 4.73 parts of the solution of Example D, diluting the mixture with water to a total solids content of 0.8% and adjusting the resulting solution to a pH of about 9.6. A foam was then generated from this solution and from a control solution containing 0.8% of the rosin salt of Example B (100% solids basis) using the foam generator of Example 1 and sufficient air pressure to provide an expansion factor of about 12.

The foam of this example and the control foam were applied to the felt side of an internally sized paper sheet at the size press of a pilot scale papermaking machine using the procedure of Example 9. The sized paper sheet was made from a 50:50 bleached hardwood; bleached softwood pulp blend beaten to a Canadian standard freeness of 500. Alum and rosin size were added to the dilute pulp slurry in an amount to provide 1.25% alum and 0.25% rosin size based on dry pulp weight. The pH of the pulp slurry was 4.5. Measurements of the sizing level (Hercules Size Test) were carried out on the treated paper sheets of this example, the control and a blank (no treatment) following aging of the sheets for 3 weeks and then conditioning of the sheets at 50% relative humidity at 72° F. for 24 hours prior to testing. The results of the tests are reported in Table VI, below.

TABLE VI

| | Basis Weight (lbs/3000 ft.²) | Hercules Sizing Test (sec) | |
|---|---|---|---|
| | | Felt Side | Wire Side |
| Example 10 | 54.2 | 405 | 155 |
| Control | 55.4 | 456 | 176 |
| Blank | 47.3 | 149 | 124 |

EXAMPLE 11

Foamable solutions were prepared according to the procedure of Example 10 except that the mixture was diluted to various concentrations ranging from 0.2 to 1.0%. The foamability of the solutions of this example and control solutions containing 0.5 and 1.0% of the rosin salt of Example B (100% solids basis) were evaluated by generating foams of the solutions using the generator of Example 1 and various air pressures. In this evaluation the minimum air pressure (the pressure required to provide an exiting foam stream which did not break immediately and which built up upon itself) and the maximum air pressure (the pressure at which the exiting foam could no longer support the air flow and pockets of air appeared in the foam stream) were determined and are recorded below in Table VII.

TABLE VIII

| Trial | Solution Concentration (%) | Air Pressure (psi) | |
|---|---|---|---|
| | | Minimum | Maximum |
| 11-1 | 0.2 | 6 | 8 |
| 11-2 | 0.3 | 6 | 14 |
| 11-3 | 0.4 | 6 | 24 |
| 11-4 | 0.5 | 6 | 28 |
| 11-5 | 1.0 | 6 | 36 |
| Control 11-A | 0.5 | 8 | 8 |
| Control 11-B | 1.0 | 6 | 38 |

Figure 1:
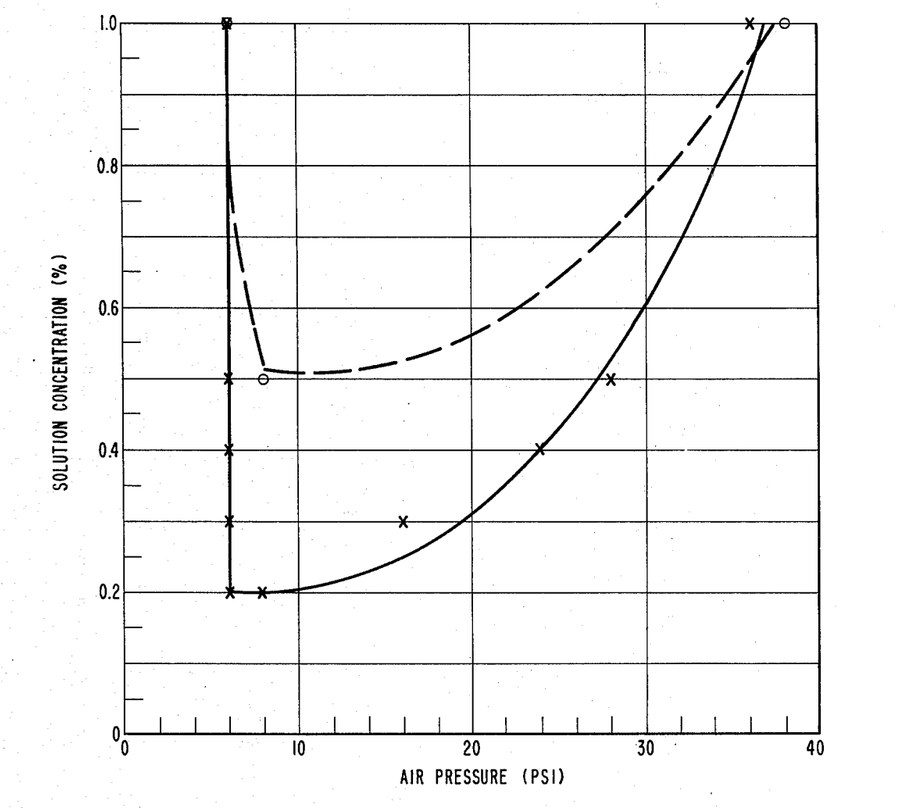

The relationship of the solution concentration to the foamability of the solution is further illustrated by reference to the accompanying drawing. The drawing is a graph wherein the data of Table VII is plotted and the air pressure (psi) is shown along the X-axis and the concentration of the solution (within the limits of 0.2 and 1.0%) is shown along the Y-axis. The solid line connecting points "X" (trials 11-1 to 11-5) shows that a minimum pressure of 6 psi provides useful foams over a range of concentrations varying from 0.2 to 1.0% whereas the broken line connecting points "O" (controls 11-A and 11-B) shows that higher concentrations are required to provide useful foams at the same pressure. Thus, the lines of the graph define the useful area over which foams can be generated at various concentrations and demonstrate the improvement in foamability which is realized by the practice of this invention.

What I claim and desire to protect by Letters Patent is:

1. In a composition suitable for surface application to a fibrous substrate, said composition being a foam produced by the aeration of an aqueous solution containing from 0.1 to 5 weight percent of a water-soluble salt of rosin or fortified rosin, the improvement wherein said aqueous solution has a pH of at least 8 and contains 0.02 to 5 weight percent of at least one water-soluble, amine-containing synthetic, addition or condensation type polymeric material compatible with said salt, the weight ratio of said salt to said polymeric material being within the range of 1:1 to 25:1.

2. The composition of claim 1 wherein the polymeric material is selected from the group consisting of (a) polyaminopolyamides, (b) reaction products of polyaminopolyamides with 0.02 to 0.2 mole of epihalohydrin for each secondary and/or tertiary amine group of the polyaminopolyamide, (c) poly(alkyleneimine)s and (d) addition-type polymers of ethylenically unsaturated monomers containing amine functionality.

3. The composition of claim 2 wherein the addition-type polymer is the addition polymerization product of
   (i) about 10 mole percent to 100 mole percent of at least one monomer selected from the group consisting of wherein $R_1$ is hydrogen or methyl, $R_2$ is a $C_1$–$C_4$ alkyl, $R_3$ is hydrogen, a $C_1$–$C_4$ alkyl, where Y is hydroxyl or halogen or and X is an anion;

wherein $R_3$ and $X^-$ are as defined in formula (I);

wherein $R_2$, $R_3$ and $X^-$ are as defined in formula (I);

wherein $R_3$ and $X^-$ are as defined in formula (I);

wherein $R_1$, $R_2$, $R_3$ and $X^-$ are as defined in formula (I), and n is an integer 1, 2 or 3; and wherein $R_1$, $R_2$, $R_3$ and $X^-$ are as defined in formula (I), and (ii) from about 90 mole percent to 0 mole percent of at least one different ethylenically unsaturated monomer.

4. The composition of claim 2 wherein said salt is the sodium salt of a maleic anhydride adduct of rosin.

5. The composition of claim 4 wherein the polymeric material is a polyaminopolyamide.

6. The composition of claim 5 wherein the polyaminopolyamide is a condensation polymer derived from diethylenetriamine and adipic acid.

7. The composition of claim 4 wherein the polymeric material is the reaction product of a polyaminopolyamide with 0.05 mole of epichlorohydrin for each secondary and/or tertiary amine group of the polyaminopolyamide.

8. The composition of claim 4 wherein the polymeric material is poly(ethylenimine).

9. The composition of claim 2 wherein said aqueous solution also contains from 0.1 to 50 weight percent of a performance material.

10. In the process for producing a foam by aerating an aqueous solution containing 0.1 to 5 weight percent of a water soluble salt of rosin or fortified rosin, the improvement which comprises incorporating in said aqueous solution prior to aerating from 0.02 to 5 weight percent of at least one water soluble, amine-containing synthetic addition or condensation type polymeric material compatible with said salt, the weight ratio of said salt to said polymeric material being within the range of 1:1 to 25:1 and carrying out the aerating step on the resulting solution at a pH of at least 8.

* * * * *

UNITED STATES PATENT AND TRADEMARK OFFICE
CERTIFICATE OF CORRECTION

PATENT NO. : 4,353,993
DATED : October 12, 1982
INVENTOR(S) : Edward G. McCrossin

It is certified that error appears in the above-identified patent and that said Letters Patent are hereby corrected as shown below:

Col. 13, line 55 " Table VIII " should read
-- Table VII --;

In the Claims, Col. 16, the formula between lines 3 and 8

"    "

should read

Signed and Sealed this

Seventh Day of December 1982

[SEAL]

Attest:

GERALD J. MOSSINGHOFF

Attesting Officer    Commissioner of Patents and Trademarks